United States Patent
Weiner et al.

(10) Patent No.: US 12,418,439 B2
(45) Date of Patent: Sep. 16, 2025

(54) METHOD AND SYSTEM FOR IDENTIFYING A MANIPULATED CONTROL DEVICE OF A BUS SYSTEM

(71) Applicant: Bayerische Motoren Werke Aktiengesellschaft, Munich (DE)

(72) Inventors: Michael Weiner, Munich (DE); Peter Winklhofer, Munich (DE); Robert Meinlschmidt, Munich (DE); Theresa Reiner, Munich (DE); Markus Anton, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 74 days.

(21) Appl. No.: 18/554,327

(22) PCT Filed: Feb. 15, 2022

(86) PCT No.: PCT/EP2022/053559
§ 371 (c)(1),
(2) Date: Oct. 6, 2023

(87) PCT Pub. No.: WO2022/238024
PCT Pub. Date: Nov. 17, 2022

(65) Prior Publication Data
US 2024/0113912 A1 Apr. 4, 2024

(30) Foreign Application Priority Data
May 11, 2021 (DE) ............. 10 2021 112 331.3

(51) Int. Cl.
*H04L 12/40* (2006.01)
(52) U.S. Cl.
CPC ............ *H04L 12/40006* (2013.01); *H04L 2012/40273* (2013.01)

(58) Field of Classification Search
CPC .................................. H04L 12/40006
See application file for complete search history.

(56) References Cited

U.S. PATENT DOCUMENTS

| | | | |
|---|---|---|---|
| 10,721,092 B2 * | 7/2020 | Kang | H04L 12/4135 |
| 2018/0189483 A1 * | 7/2018 | Litichever | G06F 13/36 |

(Continued)

FOREIGN PATENT DOCUMENTS

| | | |
|---|---|---|
| DE | 102012224194 A1 | 6/2014 |
| DE | 102016224193 A1 | 6/2018 |
| DE | 102018218902 A1 | 5/2020 |

OTHER PUBLICATIONS

International Search Report corresponding to International Patent Application No. PCT/EP2022/053559, dated Jun. 3, 2022 (4 pages).

(Continued)

*Primary Examiner* — Henry Tsai
*Assistant Examiner* — Aurangzeb Hassan
(74) *Attorney, Agent, or Firm* — Maginot, Moore & Beck LLP

(57) ABSTRACT

A method for identifying a manipulated controller of a bus system of a vehicle is disclosed herein. The method includes transmitting a first message via the bus system by means of a first controller, and receiving the first message via the bus system by means of a second controller. The method further includes determining a message type of the received first message and determining a reference message by means of the second controller, wherein the reference message has a message type that corresponds to the determined message type of the first message. The method also includes determining a deviation of the first message from the reference message. When the first message deviates from the reference message, the method further includes identifying the first controller as the manipulated controller by means of the (Continued)

second controller, and providing an alarm message from the second controller to a server outside the vehicle.

19 Claims, 2 Drawing Sheets

(56) References Cited

U.S. PATENT DOCUMENTS

| | | | |
|---|---|---|---|
| 2018/0218158 A1* | 8/2018 | Amano | H04L 12/40006 |
| 2018/0227306 A1* | 8/2018 | Borkowicz | H04L 63/0227 |
| 2018/0302422 A1* | 10/2018 | Kishikawa | H04L 9/3271 |
| 2018/0367546 A1 | 12/2018 | Miyashita | |
| 2019/0173912 A1* | 6/2019 | Ujiie | H04L 12/40 |
| 2020/0053112 A1* | 2/2020 | Torisaki | H04L 63/1425 |
| 2020/0387605 A1 | 12/2020 | Gilad et al. | |
| 2023/0327907 A1* | 10/2023 | Natori | H04L 12/46 |
| | | | 710/305 |
| 2023/0379186 A1* | 11/2023 | Kim | H04L 12/40006 |
| 2024/0137243 A1* | 4/2024 | Schaefer | H04L 12/40169 |

OTHER PUBLICATIONS

Written Opinion corresponding to International Patent Application No. PCT/EP2022/053559, dated Jun. 3, 2022 (6 pages).
German Search Report corresponding to German Patent Application No. 10 2021 112 331.3, dated Jan. 17, 2022. (5 pages).

\* cited by examiner

METHOD AND SYSTEM FOR IDENTIFYING A MANIPULATED CONTROL DEVICE OF A BUS SYSTEM

CROSS-REFERENCE TO RELATED APPLICATIONS

The present application is the U.S. national phase of PCT Application PCT/EP2022/053559 filed on Feb. 15, 2022, which claims priority of German patent application No. 2021 112 331.3 filed on May 11, 2021, the entire contents of which are incorporated herein by reference.

FIELD

This disclosure relates to a method for identifying a manipulated control device of a bus system of a vehicle by means of a second control device of the bus system of the vehicle. The disclosure further relates to a computer-readable medium for identifying a manipulated control device of a bus system of a vehicle by means of a second control device of the bus system of the vehicle, a system for identifying a manipulated control device of a bus system of a vehicle by means of a second control device of the bus system of the vehicle, and a vehicle comprising the system for identifying a manipulated control device of a bus system of a vehicle by means of a second control device of the bus system of the vehicle.

BACKGROUND

Controllers are commonly used in vehicles. Controllers (which may also be referred to herein as "control devices," "control units," "processors" or "microprocessors") include circuits (e.g., integrated circuits) that contain typical functionality of central processing units (CPU) and are configured to perform various calculations and analysis based on manufacturer programming. Examples of controllers used in vehicles include any of various Engine Control Units (ECNs) commonly used by different manufacturers in modern automobiles.

Control devices of vehicles are interconnected via bus systems. The control devices can exchange messages via a bus system in order to control functions of the vehicle. If one control device transmits messages on a bus system without authorization, a function of another control device can be influenced without authorization. Verification of the legitimacy of a transmitter of bus messages does not currently take place.

SUMMARY

It would be advantageous to provide a system and method to efficiently identify a manipulated control device on a bus system of a vehicle. In particular, an advantage of various embodiments disclosed herein is to efficiently identify a manipulated transmitter of a message on a bus system by means of a further control device of the bus system of the vehicle.

According to a first embodiment, a method is disclosed for identifying a manipulated control device of a bus system of a vehicle by means of a second control device of the bus system of the vehicle. The method can be a computer-implemented method and/or a control-device-implemented method. The bus system can be a CAN bus. The vehicle can be a motor vehicle. The method comprises transmitting a first message via the bus system by means of a transmit unit of a first control device of the vehicle, receiving the first message via the bus system by means of a receive unit or a transceiver unit of the second control device of the vehicle. The method further comprises determining a message type of the received first message by means of the second control device, and determining a reference message by means of the second control device of the vehicle, wherein the reference message has a message type that corresponds to the determined message type of the first message. The method further comprises determining a deviation of the first message from the reference message. If the first message deviates from the reference message, the method identifies the first control device as the manipulated control device by means of the second control device and provides an alarm message from the second control device to a server outside the vehicle.

Advantageously, the method can efficiently identify a manipulated control device. Messages from the bus system are received by the second control device and are compared with a reference message of the second control device in order to establish whether the first control device is an authorized transmitter of the received message. If the first control device is an unauthorized or manipulated transmitter of a message on the bus system, the authorized transmitter of the message, the second control device, can efficiently identify the unauthorized or manipulated transmitter by means of the reference message. Manipulations of control devices of the vehicle can therefore be quickly identified and reported to a server outside the vehicle.

According to one advantageous design of the embodiments disclosed herein, the reference message can be the last successfully transmitted message of the second control device which has the message type of the received first message. The reference message can thus be efficiently determined.

According to a further advantageous design of the embodiments disclosed herein, the reference message can be a message for which the second control device is the sole trustworthy message source on the bus system. The second control device can thus efficiently identify a manipulated control device.

According to a further advantageous design of the embodiments disclosed herein, the reference message can be transmitted by the second control device via the bus system before the first message is received, and the reference message can be stored on the second control device following a successful transmission of the reference message. The second control device can thus efficiently determine the reference message.

According to a further advantageous design, the method can further comprise rejecting the first message by means of the second control device if the first message corresponds to the reference message. The second control device can thus filter messages transmitted by itself and received via the bus system.

According to a further advantageous design, the second control device can be a gateway control device of the bus system. The second control device can thus efficiently monitor a multiplicity of messages from further control devices of the bus system and can quickly identify manipulated control devices.

According to a further advantageous design, the bus system can be a CAN bus system.

According to a further aspect, an embodiment is characterized by a computer-readable medium for identifying a manipulated control device of a bus system of a vehicle by means of a second control device of the bus system of the vehicle, wherein the computer-readable medium comprises instructions which, when executed on a control device of a vehicle, carry out the method described above.

According to a further aspect, an embodiment is characterized by a system for identifying a manipulated control device of a bus system of a vehicle by means of a second control device of the bus system of the vehicle, wherein the system is designed to carry out the method described above.

According to a further aspect, an embodiment is characterized by a vehicle comprising the system described above for identifying a manipulated control device of a bus system of the vehicle by means of a second control device of the bus system of the vehicle.

Further features of various embodiments are set out in the claims, the figures and the description of the figures. All features and feature combinations mentioned above in the description, and also the features and feature combinations mentioned below in the description of the figures and/or shown in the figures alone are usable not only in the respectively indicated combination, but also in other combinations or in isolation.

BRIEF DESCRIPTION OF THE DRAWINGS

A preferred exemplary embodiment is described below with reference to the attached drawings. Further details, preferred designs and developments of the various embodiments are described therein. In detail.

DETAILED DESCRIPTION

Figure 1:
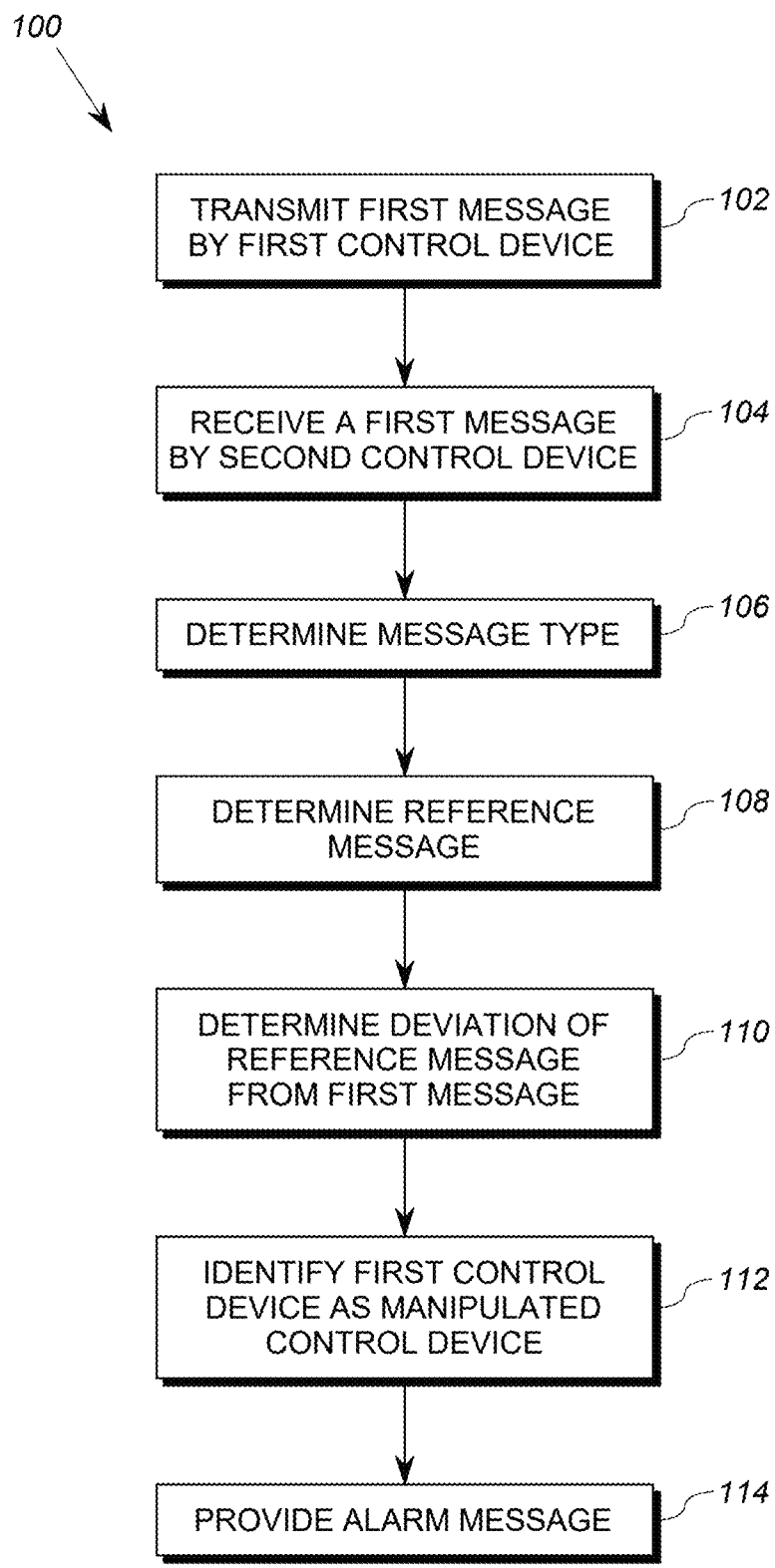
FIG. 1 shows schematically an example method for identifying a manipulated control device of a bus system of a vehicle.

In detail, FIG. 1 shows an example method 100 for identifying a manipulated control device of a bus system of a vehicle by means of a second control device of the bus system of the vehicle. Only one single control device, referred to below as the second control device, which can be an authorized transmitter of a message, also referred to below as a reference message, on the bus system is preferably present in the bus system of the vehicle.

The method 100 can transmit 102 a first message via the bus system by means of a transmit unit of a first control device of the vehicle. The first control device can be a manipulated control device. The first message can comprise, for example, a signal for adjusting a speed limit of the vehicle to a value not authorized by a manufacturer of the vehicle.

The method 100 can receive 104 the first message via the bus system by means of a receive unit or a transceiver unit of the second control device of the vehicle. The method 100 can further determine 106 a message type of the received, first message by means of the second control device. The message type can be, for example, adjustment of the speed limit of the vehicle.

The method 100 can determine 108 a reference message by means of the second control device of the vehicle, wherein the reference message has a message type that corresponds to the determined message type of the first message. The reference message can be a last successfully transmitted message of the second control device which has the message type of the received first message. Additionally or alternatively, the reference message can be a message for which the second control device is the sole trustworthy message source on the bus system. Additionally or alternatively, the reference message can be transmitted by the second control device via the bus system before the first message is received, and the reference message can be stored on the second control device following a successful transmission of the reference message. If the message type is, for example, adjustment of the speed limit of the vehicle, the second control device can determine the associated reference message on the basis of the message type. The second control device can, for example, transmit a message with the message type adjustment of the speed limit of the vehicle during an initial configuration of the second control device in order to set the speed limit of the vehicle to a value predefined by the manufacturer of the vehicle. Following the successful transmission of the message with the message type adjustment of the speed limit of the vehicle, the second control device can store this message. Finally, the stored message serves as a reference message in order to identify a manipulated control device which is attempting to transmit an unauthorized message with the message type adjustment of the speed limit of the vehicle on the bus system.

The method 100 can determine 110 a deviation of the first message from the reference message. The method can, for example, compare the value of the speed limit of the first message with the value of the speed limit of the reference message in order to determine a deviation. If the first message deviates from the reference message, the method 100 can identify 112 the first control device as the manipulated control device by means of the second control device and can provide 114 an alarm message from the second control device to a server outside the vehicle.

Figure 2:
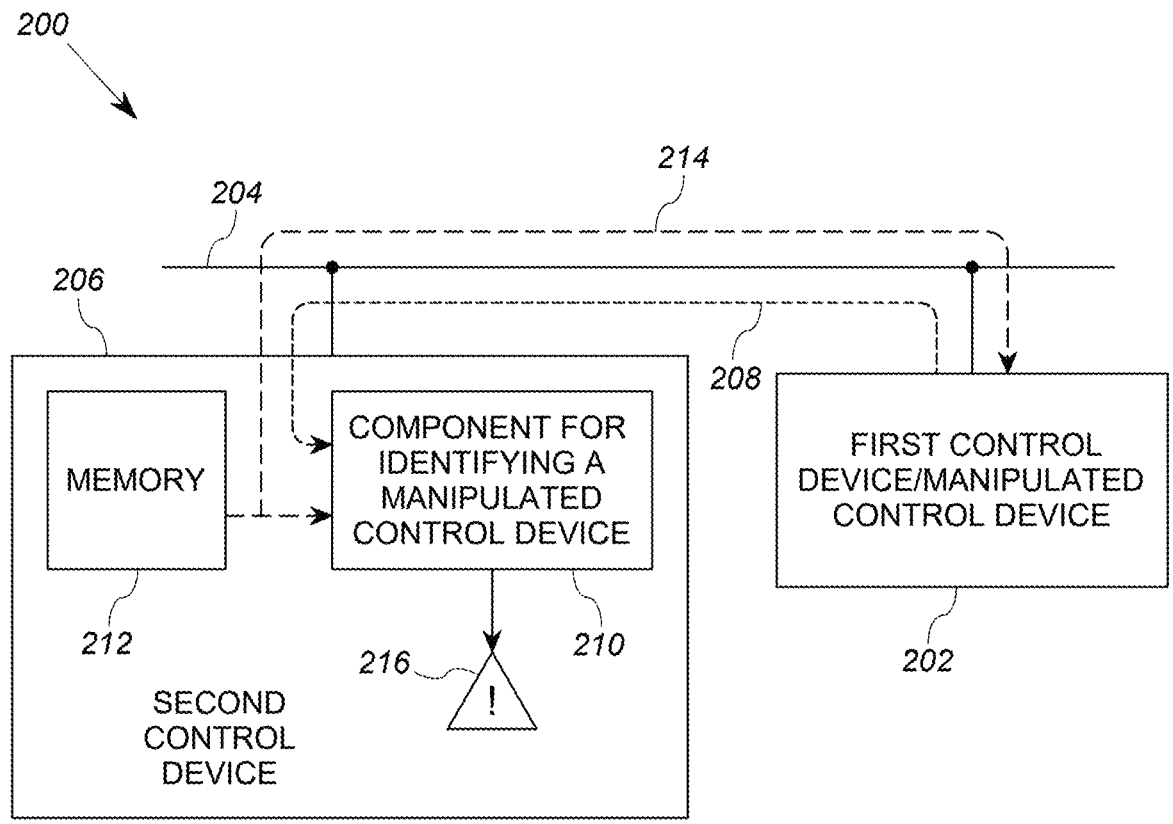
FIG. 2 shows schematically an example system for identifying a manipulated control device of a bus system of a vehicle.

In detail, FIG. 2 shows an example system 200 for identifying a manipulated control device 202 of a bus system 204 of a vehicle by means of a second control device 206. A first or a manipulated control device 202 can transmit a first message 208 having a first message type via the bus system 204 by means of a transmit unit of the first control device 202 of the vehicle. The second control device 206 can receive the first message 208 having the first message type via the bus system 204 by means of a receive unit or a transceiver unit of the second control device 206 of the vehicle. The receive unit 210 or the transceiver unit of the second control device can preferably comprise a component 210 for identifying a manipulated control device. The second control device 206, in particular the component 210 of the second control device 206, can determine a message type of the received first message 208. The second control device 206, in particular the component 210 of the second control device 206, can determine a reference message, wherein the reference message has a message type which corresponds to the determined message type of the first message. The component 210 can, for example, retrieve the reference message from a memory 212 which has stored the last successfully transmitted message 214 having the same message type. The second control device 206, in particular the component 210 of the second control device 206, can determine a deviation of the first message from the reference message, and, if the first message deviates from the reference message, can identify the first control device as the manipulated control device, and can provide an alarm message 216 to a server outside the vehicle.

The second control device, as the authorized transmitter of a message, can advantageously monitor the bus system for unauthorized messages from manipulated control devices. For a message for which only one authorized transmitter is present on the bus system, the transmitter, for example the second control device, can trigger an alarm by identifying an unauthorized message from a manipulated control device if the authorized transmitter itself has not transmitted this message. A manipulated control device can thus be efficiently identified and reported.

REFERENCE SIGN LIST

100 Method
102 Transmit a first message by means of a first control device
104 Receive a first message by means of a second control device
106 Determine a message type
108 Determine a reference message
110 Determine a deviation of the reference message from the first message
112 Identify the first control device as the manipulated control device
114 Provide an alarm message
200 System
202 First control device/manipulated control device
204 Bus system
206 Second control device
208 First message
210 Component for identifying a manipulated control device
212 Memory
214 Reference message
216 Alarm message

What is claimed is:

1. A method for identifying a manipulated controller of a bus system of a vehicle by means of a second controller of the bus system of the vehicle, the method comprising:
    transmitting a first message via the bus system by means of a transmitter of a first controller of the vehicle;
    receiving the first message via the bus system by means of a receiver or a transceiver of the second controller of the vehicle;
    determining a message type of the received first message by means of the second controller;
    determining a reference message by means of the second controller of the vehicle, wherein the reference message has a message type that corresponds to the determined message type of the first message;
    determining a deviation of the first message from the reference message; and
    when the first message deviates from the reference message:
        identifying the first controller as the manipulated controller by means of the second controller; and
        providing an alarm message from the second controller to a server outside the vehicle; and
    wherein the reference message is a last successfully transmitted message of the second controller which has the message type of the received first message.

2. The method as claimed in claim 1, wherein the reference message is a message for which the second controller is a sole trustworthy message source on the bus system.

3. The method as claimed in claim 1, wherein the reference message is stored on the second controller following a successful transmission of the reference message.

4. The method as claimed in claim 1, the method further comprising:
    when the first message corresponds to the reference message:
        rejecting the first message by means of the second controller.

5. The method as claimed in claim 1, wherein the second controller is a gateway controller of the bus system.

6. The method as claimed in claim 1, wherein the bus system is a CAN bus system.

7. A non-transitory computer-readable medium for identifying a manipulated controller of a bus system of a vehicle by means of a second controller of the bus system of the vehicle, wherein the computer-readable medium comprises instructions which, when executed on the second controller of the vehicle:
    receive a first message from a first controller of the vehicle via the bus system by means of a receiver or a transceiver of the second controller of the vehicle;
    determine a message type of the received first message by means of the second controller;
    determine a reference message by means of the second controller of the vehicle, wherein the reference message has a message type that corresponds to the determined message type of the first message;
    determine a deviation of the first message from the reference message; and
    when the first message deviates from the reference message:
        identify the first controller as the manipulated controller by means of the second controller; and
        provide an alarm message from the second controller to a server outside the vehicle; and
    wherein the reference message is a last successfully transmitted message of the second controller which has the message type of the received first message.

8. The non-transitory computer-readable medium of claim 7, wherein the reference message is a message for which the second controller is a sole trustworthy message source on the bus system.

9. The non-transitory computer-readable medium of claim 7, wherein the reference message is stored on the second controller following a successful transmission of the reference message.

10. The non-transitory computer-readable medium of claim 7, wherein when the first message corresponds to the reference message, the computer-readable medium comprises instructions which, when executed on the second controller of the vehicle, rejects the first message.

11. The non-transitory computer-readable medium of claim 7, wherein the second controller is a gateway controller of the bus system.

12. The non-transitory computer-readable medium of claim 7, wherein the bus system is a CAN bus system.

13. A vehicle comprising:
    a bus system; and
    a first controller configured to transmit a first message via the bus system by means of a transmitter of the first controller of the vehicle; and
    a second controller configured to:
        receive the first message via the bus system by means of a receiver or a transceiver of the second controller of the vehicle;
        determine a message type of the received first message;
        determine a reference message, wherein the reference message has a message type that corresponds to the determined message type of the first message;
        determine a deviation of the first message from the reference message; and
        when the first message deviates from the reference message:

identify the first controller as the manipulated controller by means of the second controller; and provide an alarm message from the second controller to a server outside the vehicle; and wherein the reference message is a last successfully transmitted message of the second controller which has the message type of the received first message.

14. The vehicle of claim 13, wherein the reference message is a message for which the second controller is a sole trustworthy message source on the bus system.

15. The vehicle of claim 13, wherein the reference message is stored on the second controller following a successful transmission of the reference message.

16. The vehicle of claim 13, wherein:
when the first message corresponds to the reference message, the second controller rejects the first message.

17. The vehicle of claim 13, wherein the second controller is a gateway controller of the bus system.

18. The vehicle of claim 17, wherein the bus system is a CAN bus system.

19. The vehicle of claim 13, wherein the bus system is a CAN bus system.

* * * * *